W. SAILER.
LIFTING-JACKS.

No. 184,433. Patented Nov. 14, 1876.

Witnesses
Henry Howson Jr.
Harry Smith

William Sailer
by his Attorneys
Howson and Son

UNITED STATES PATENT OFFICE.

WILLIAM SAILER, OF PHILADELPHIA, PENNSYLVANIA, ASSIGNOR TO AUGUSTUS BEAN AND JACOB V. BEAN, OF SAME PLACE.

IMPROVEMENT IN LIFTING-JACKS.

Specification forming part of Letters Patent No. 184,433, dated November 14, 1876; application filed October 25, 1876.

*To all whom it may concern:*

Be it known that I, WILLIAM SAILER, of Philadelphia, Pennsylvania, have invented an Improved Lifting-Jack, of which the following is a specification:

The object of my invention is to construct a cheap, strong, and compact lifting-jack, and this object I attain in the manner which I will now proceed to describe, reference being had to the accompanying drawing, in which—

Figure 1:
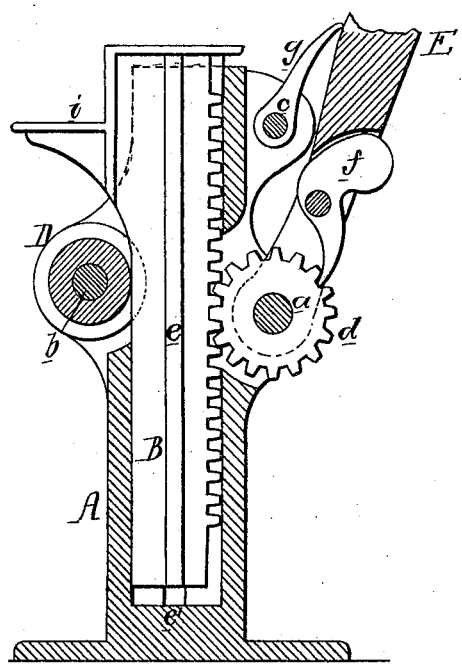
Figure 2:
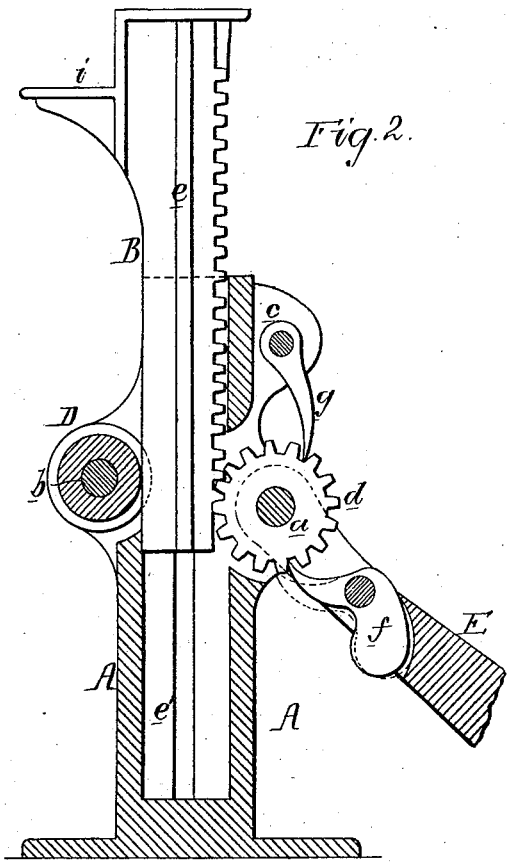
Figure 3:
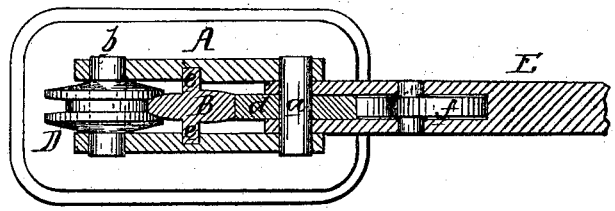

Figures 1 and 2 are vertical sectional views of my improved jack, with the working parts in different positions; and Fig. 3 a sectional plan view of the same.

A represents a post or standard, tubular at the lower end, and so formed at the upper portion as to provide bearings for three shafts, $a, b,$ and $c$. The shaft $a$ carries a cog-wheel, $d$, the teeth of which engage with a rack formed on the rear edge of a stem, B, which has a rib, $e$, at each side, adapted to a groove, $e'$, in the corresponding side frame of the standard A, the front edge of the stem B being adapted to a grooved wheel, D, carried by the shaft $b$. The shaft A serves as a pivot for a lever, E, which is forked at its inner end so as to embrace the wheel $d$, and carries a weighted pawl, $f$, the point of which is adapted to the teeth of said wheel, and serves to turn the same so as to raise the stem B, when the outer end of the lever E is depressed. The shaft $c$ carries a pawl, $g$, which is also adapted to the teeth of the wheel $d$, and serves, when in gear with the teeth, to prevent back movement of the same—that is, movement in a direction corresponding with the downward movement of the stem B. The upper end of the stem B is provided with a flange, $i$, so as to form a step which is used in connection with low axles, the top of the stem itself being used for high axles. By this means the jack can be caused to operate upon either high or low axles, as desired, without any loss or movement in bringing the stem to bear on the axle. Lateral steadiness of the stem is insured, partly by the side ribs $e\,e$, and partly by the grooved wheel D, the side ribs $e$ also serving to impart strength to the stem.

The above-described jack is compact in size, direct in operation, and, owing to the fewness and simplicity of its parts, is economical in cost.

I claim as my invention—

1. The combination, in a lifting-jack, of the cog-wheel $d$, with the toothed stem B, pivoted lever E, and its weighted pawl $f$, and hinged pawl $g$, adapted to the said cog-wheel, substantially as set forth.

2. The combination of the standard A and and its grooves $e'$, with the toothed stem B, and its rib $e$, the cog-wheel $d$, and the grooved roller D.

In testimony whereof I have signed my name to this specification in the presence of two subscribing witnesses.

WILLIAM SAILER.

Witnesses:
 HERMANN MOESSNER,
 HARRY SMITH.